(12) United States Patent
Brey (10) Patent No.: US 9,452,720 B2
(45) Date of Patent: Sep. 27, 2016

(54) TELEMATICS MASTER OF POWER (75) Inventor: Thomas A. Brey, Lake In The Hills, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 726 days.

(21) Appl. No.: 13/360,118

(22) Filed: Jan. 27, 2012

(65) Prior Publication Data
US 2013/0193753 A1  Aug. 1, 2013

(51) Int. Cl.
H02H 7/18 (2006.01)
B60R 16/023 (2006.01)
H02J 7/00 (2006.01)
H02J 9/00 (2006.01)

(52) U.S. Cl.
CPC ......... *B60R 16/0231* (2013.01); *H02J 7/0032* (2013.01); *H02J 9/002* (2013.01)

(58) Field of Classification Search
CPC .... B60R 16/0231; H02J 7/0032; H02J 9/002
USPC ................................................ 307/10.7, 101
See application file for complete search history.

(56) References Cited

U.S. PATENT DOCUMENTS

| | | | |
|---|---|---|---|
| 7,394,350 B2* | 7/2008 | Yoshida et al. | 340/426.11 |
| 2005/0234604 A1* | 10/2005 | Nakamura et al. | 701/2 |
| 2007/0073944 A1* | 3/2007 | Gormley | 710/72 |
| 2007/0112476 A1* | 5/2007 | Obradovich | 701/1 |
| 2010/0082198 A1* | 4/2010 | Arai et al. | 701/29 |
| 2010/0102630 A1* | 4/2010 | Turski et al. | 307/10.7 |

FOREIGN PATENT DOCUMENTS

JP       2006160176 A  * 6/2006

OTHER PUBLICATIONS

Translation for JP2006160176A; Jun. 2006.*
Search Report dated Jul. 11, 2012, from corresponding GB Patent Application No. 1203464.1.

* cited by examiner

*Primary Examiner* — Jared Fureman
*Assistant Examiner* — Joel Barnett (57) ABSTRACT When a vehicle is "off" many electrically powered devices will continue to draw power from the battery, which will eventually deplete the battery. Instead of leaving such devices on, when the engine is shut off, a message is transmitted from a vehicle's telematics communications device to one or more of: the operator, a telematics service provider or elsewhere, and which notifies the recipient of the power-down condition. The recipient of the message can thereafter respond with a directive that tells the telematics communications device which devices to leave powered on, turn off or schedule to be shut off. Absent such a message, the system powers down devices according to a default power down ordering.

19 Claims, 5 Drawing Sheets

TELEMATICS MASTER OF POWER

BACKGROUND

Today's vehicles are filled with electronic devices that make driving safer and at least somewhat more enjoyable because of the communications, entertainment and other functionality they provide. Vehicles having advanced electronics devices are typically designed and constructed such that the electronic devices will continue to draw current from the vehicle's battery even when the car is turned off. Even a "stand-by" current drain can deplete a car battery if the car is parked for a long period of time in the "off" state.

It is well known that a telematics communication system that continuously monitors the vehicle's condition and reports the same to a telematics service provider can completely deplete a car battery two to four weeks, depending on battery size, its age and temperature, leaving the driver of such a vehicle stranded. While it is important to keep a telematics communication system operating in order to be able to report the vehicle's condition and respond to external commands from a telematics service provider, extending the battery life in vehicle's equipped with electronic devices and telematics communication systems would be an improvement over the prior art.

BRIEF SUMMARY

When a vehicle is "off" many electrically powered devices will continue to draw power from the battery, which will eventually deplete the battery. Instead of leaving such devices on, when the engine is shut off, a message is transmitted from a vehicle's telematics communications device to one or more of: the operator, a telematics service provider or elsewhere, and which notifies the recipient of the power-down condition. The recipient of the message can thereafter respond with a directive that tells the telematics communications device which devices to leave powered on, turn off or schedule to be shut off. Absent such a message, the system powers down devices according to a default power down ordering.

DETAILED DESCRIPTION

Figure 1:
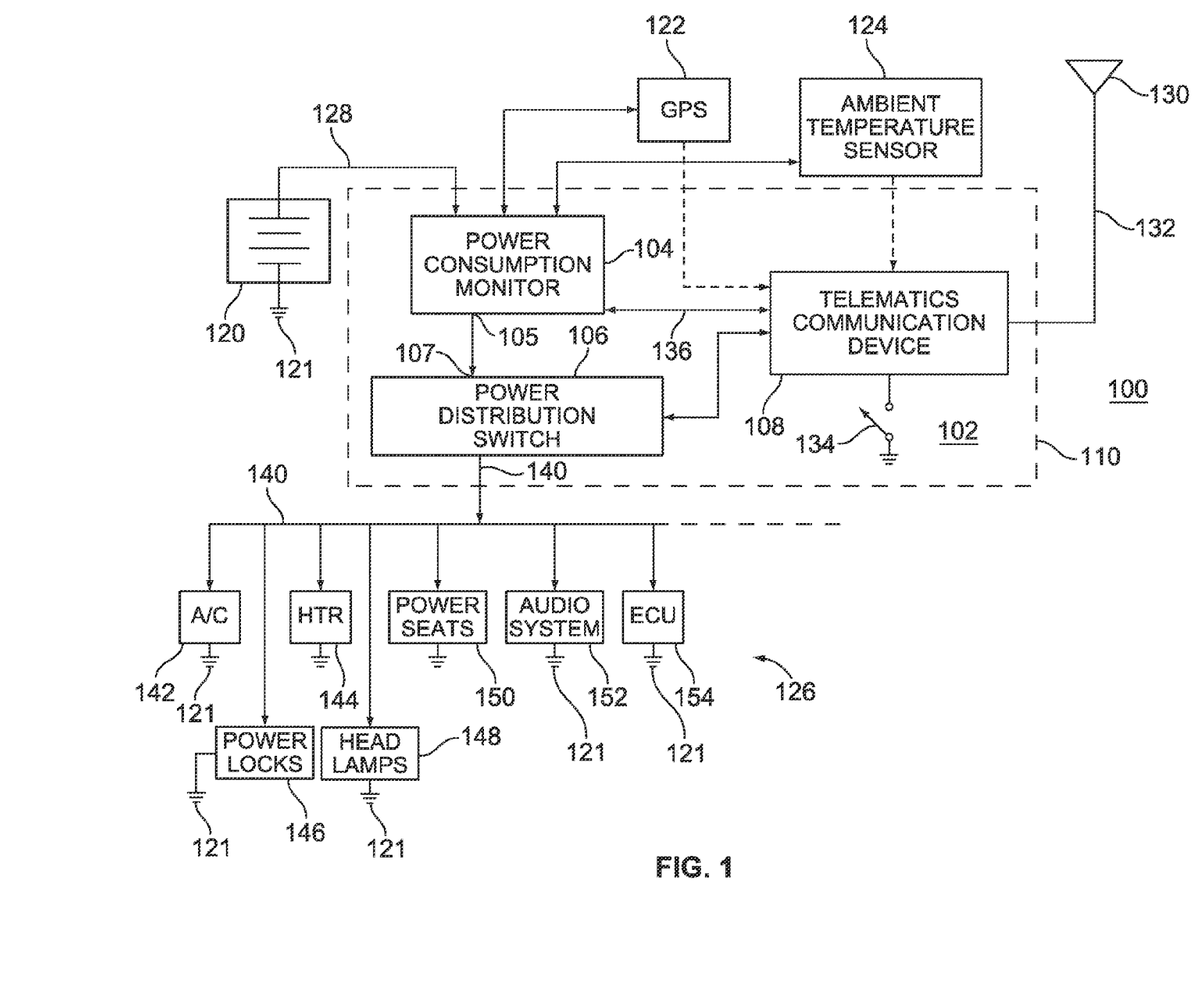
FIG. 1 is a block diagram of an apparatus for controlling power consumption in a vehicle equipped with several electrically-powered devices

FIG. 1 is a block diagram of an electrical system 100 for a vehicle, the vehicle itself being omitted from the figure for brevity. The electrical system 100 is comprised of an apparatus 102 for controlling power consumption in the vehicle, which is also referred to herein as a power consumption controller. It is also considered to be a master of power consumption.

The apparatus 102 has a power consumption monitor 104, a power distribution switching switch 106 and a telematics communications device 108. The devices that comprise the apparatus 102, and which can themselves be comprised of hardware or circuitry as well as a processor that executes program instructions stored in a non-volatile memory device, are enclosed within a broken line identified by reference number 110.

In addition to the apparatus for controlling power consumption 102, the electrical system 100 is also comprised of a battery 120, which provides electrical energy to the electrical and electronic devices depicted in FIG. 1. A global positioning system 122 or GPS 122 provides location data and other navigation capability. An ambient temperature sensor 124 provides a signal or data representative of an ambient temperature of where the vehicle is located.

In the embodiment shown in FIG. 1, the apparatus 102 is controlled by the telematics communication device 108. In a preferred embodiment, the telematics communications device is a wireless communications device compatible with a "cellular" type radio communications system. As used herein, the term "cellular" refers to a radiotelephone system in which a geographical area, such as a city, is divided into small sections each section being provided with two-way communications services by a transmitter and receiver of limited range.

The power consumption monitor 104 is configured to measure or determine the electric power consumed by each of several electrical and electronic devices 126 that also comprise the system 100. Circuits and methods to measure current consumption are well known in the prior art and a description of them is omitted for brevity.

The power consumption monitor 104 is connected to, and obtains power for the devices 126 from the vehicle's battery 102 by way of a bus 128. The bus 128 extends from the battery 120 to an input of the power consumption monitor 104. An output bus 105 of the power consumption monitor 104 provides electric power to the input 107 of a power distribution switch 106. A global positioning system or GPS 122 and the ambient temperature 124 are also coupled to the power consumption monitor 104 which monitors the power they consume.

By virtue of its connection to the battery 120 the power consumption monitor 104 is configured to test the capacity remaining in the battery 120. Battery capacity is usually measured in amp-hours, which is a quantity well-known to those of ordinary skill in the electrically arts as a time in hours, or fractional part thereof, during which the battery can deliver some number of amperes, or fraction thereof.

The telematics communications device 108 in the preferred embodiment is comprised of a conventional cellular telephone. It transmits information-bearing signals to, and receives information-bearing signals from a telematics service provider, not shown, using a conventional antenna 130 coupled to the telematics communications device 108 by a conventional transmission line 132. General Motors' "ON-STAR™" is an example of a telematics service. The entity that provides one or more of the "ON-STAR™" service or functionality and/or associated hardware or "backbone" is considered herein to be an example of a telematics service provider.

In a first embodiment, the telematics communications device 108 is provided with electronic circuitry or processing capability, which is able to keep track of, and respond to, the electric power consumed by each of the several electrical devices 126 that comprise the electrical system 100. It is also able to detect when the vehicle is shut off. As shown in the figure, the on/off state of the vehicle is detected by the open or closed state of a switch 134, typically a part of the vehicle's ignition switch, omitted for brevity.

The function or capabilities of the telematics communication device 108 includes detecting when the vehicle is off by virtue of the switch 134 or an equivalent thereof. It is able to obtain power consumption information from the power consumption monitor 104, whether the vehicle is on or off and thus monitors the electric power consumption of each of each of the electrical devices in the vehicle.

Battery capacity is determined by the power consumption monitor 104. The battery capacity, as measured in amp-hours remaining in the battery 120, is provided to the telematics communications device 108 by a conventional address/data/control bus 136, commonly found in microprocessors and microcontrollers, and which couples the power consumption monitor 104 to the telematics communications device 108.

The telematics communications device 108 is configured to transmit a message to either a telematics service provider or a vehicle operator, which can include the vehicle's owner, a driver or perhaps a lessee. Among other things, the message reports the power consumption rate of the devices 126 that comprise the electrical system 100, the estimated battery life remaining in the battery 120 and a projection of how long the existing battery capacity can continue to provide power to the "powered-up" devices 126 before the vehicle will not be able to be started. Stated another way, the telematics communication device 108 transmits a power consumption notification message from which a telematics service provider or vehicle owner can decide or determine whether to selectively power off various electrical devices of the system 100.

After the power consumption notification message is transmitted from the telecommunications device 108, it is configured to expect a response to that power consumption notification message and respond accordingly. In a preferred embodiment, the telematics communications device 108 receives a message from either a telematics service provider or a user or operator of the vehicle, by a way of a data message the contents of which specify the identity of electrical devices 126 to be powered off and the order in which they are to be shut off according to a variety of different parameters and/or conditions.

The electrical devices 126 that are controllable by the telematics communications device 108 are several devices that are coupled to a power distribution switch 106. The power distribution switch 106 is essentially a switched matrix (matrix of switches) by which electrical power from the power consumption monitor 104 can be selectively provided to various devices 126 over a power distribution bus 140. The power distribution bus 140 is therefore comprised of several individual conductors carrying battery voltage with the vehicle chassis providing a return path or ground 121.

As FIG. 1 is drawn, the electrical devices 126 that are electrically attached to the power distribution bus 140 are controllable by the power distribution switch 106, the power consumption monitor 104 and the telematics communications device 108. They include an electrically-powered or a conventional, engine-powered, belt-driven air conditioning system 142, an electric vehicle compartment heater 144, electric door locks 146, headlamp intensity or operability 148, the enablement or disenablement of electrical accessories such as power seats 150, an audio system or even the electronic control unit "ECU" 154 of the engine. The control of electrical power to the various devices 126 by a power distribution bus 140 can be readily accomplished using devices and techniques known in the art. A detailed description of them is therefore omitted for brevity.

By way of example, the power consumption controller 102 detects when the vehicle is off by virtue of switch 134, evaluates the battery capacity, the current draw of each of the electrical devices 126, calculates the time remaining at the current rate of usage and transmits a power consumption notification message to an operator. The message will include within it, the calculated or estimated time remaining for the battery at the current rate of usage. When the operator receives the power consumption notification message, the operator can selectively power off devices such as the engine control unit 154, an alarm system or disable a heater 144, or air conditioner 142 in order to extend the usable life of the battery 120 from a remote location and thereby extend the time the vehicle can be left unattended and yet re-startable when the operator returns. In a preferred embodiment, and as described more fully below, one or more of the apparatus 102 and the telecommunications device 108 are configured to provide an interactive dialogue between the vehicle and a remotely located operator of the vehicle. The dialogue is comprised of one or more power-reducing, operational changes to the vehicle presented to the operator on the display device of the operator's wireless communications device and through which the operator can select to be implemented by the apparatus 102.

Which devices 126 are powered off, the order in which they are powered off and the times at which they are powered off and the duration that they are powered off, is selectable by the user configuring one or more power-down instruction messages, which the telematics communication device 108 expects to received within a finite period of time after it transmits the power consumption notification message. If a power-down instruction message is not received within a predetermined period of time after the power consumption notification message is sent, the power consumption controller 102 is configured to autonomously power-down various electrical devices 126 according to a default specification stored within the telematics communications device 108.

The default ordering of electrical device shut-down or disablement is preferably an ordering of that is determined by an expected power requirement of the battery, such as the amount of power that will be required by the battery in order to start the vehicle, at some future date and time specified by the user or programmed by default. The anticipated power requirements are preferably determined by conditions or events that affect every battery's ability to start an engine. Those conditions are the ambient temperature, how long the battery has been in an off state or its elapsed time in the off state, the battery's age, its initial charge level and a history of the battery's requirements, i.e., a history of how much power is required to start an engine which will be affected by a variety of engine characteristics.

Figure 2:
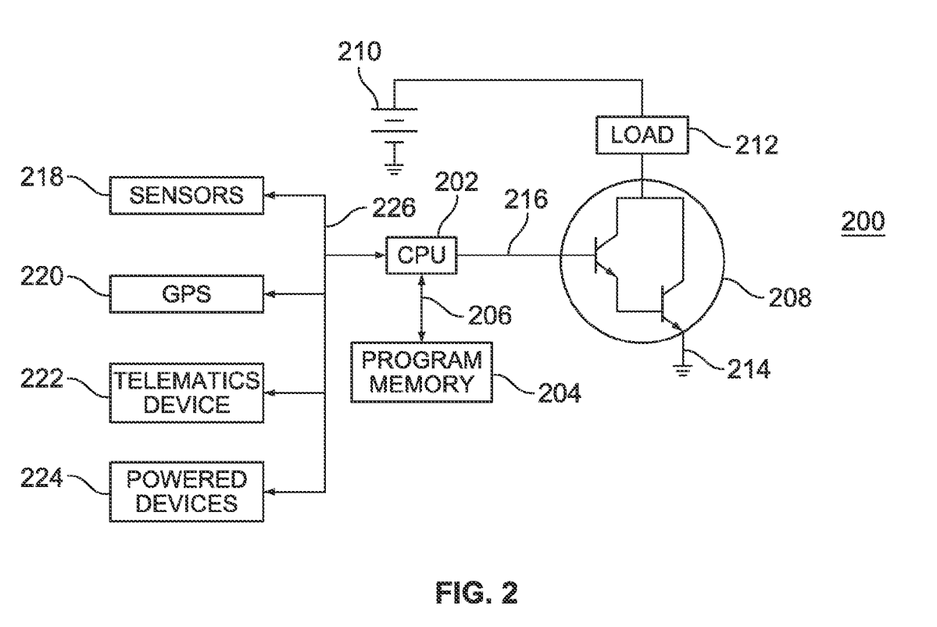
FIG. 2 is a block diagram of an alternate embodiment of an apparatus for controlling power consumption.

FIG. 2 is an alternate embodiment of an apparatus for controlling power consumption in a vehicle. The apparatus of FIG. 2 is comprised of a processor or CPU 202 coupled to a conventional program memory device 204 via a conventional address/control/data bus 206. When executed by the CPU 202, program instructions stored in the memory 204 imbue the processor or CPU 202 with the ability to control a semi-conductor device 208, such as the Darlington pair transistor 208 shown, which acts as a switch mechanism: it allows current to flow from a battery 210 through a load 212 to ground 214 responsive to a control signal 216 that it receives from the CPU 202. The semi-conductor device 208 is thus able to turn on a load and turn off a load by virtue of a signal 216 output to the semi-conductor device 208 by the CPU 202. The signal 216 is provided according to program instructions stored in the memory device when they are executed by the CPU.

The CPU 202 is also coupled to various vehicle sensors 218 through one or more conventional I/O ports, omitted for brevity. Such sensors would include ambient temperature sensors, a battery condition sensor, a current drain sensor, a collision detector and so forth. A global positioning system 220, a telematics communication device 222 and various powered devices 224 are all connected to or coupled to CPU 202 via a conventional address and control bus 226. The bus 226 thus provides the CPU 202 the ability to talk to and listen and therefore control various peripheral devices coupled to the CPU 202 via the bus 226.

Figure 3:
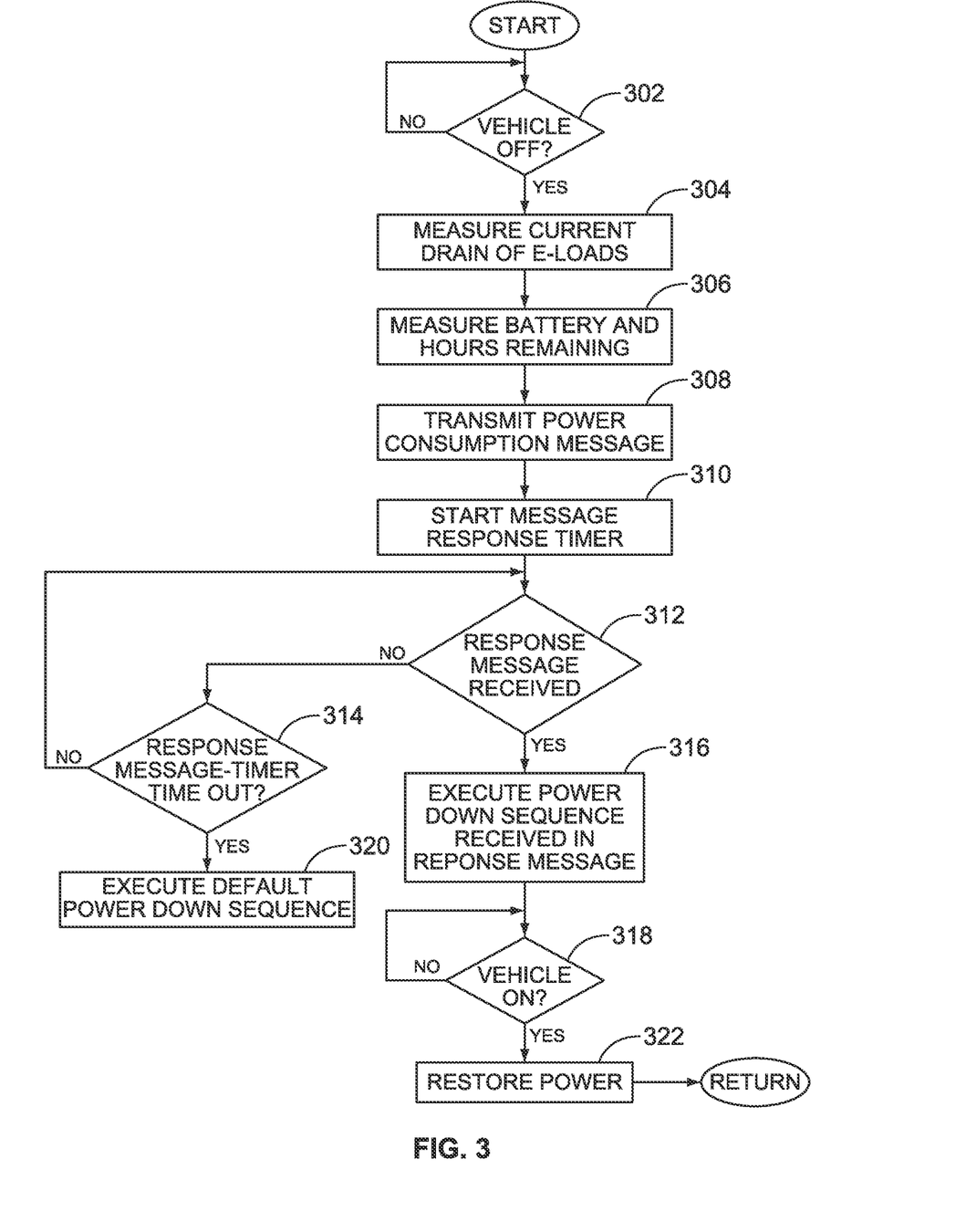
FIG. 3 is a flowchart depicting steps of a method of controlling or reducing power consumption in a vehicle.

FIG. 3 depicts steps of a method for controlling power consumption in a vehicle. It is but one embodiment of a method that can be implemented by either one of the systems depicted in FIG. 1 or FIG. 2 or equivalents thereof.

As a preliminary matter, step 302 determines whether the vehicle is "on" or "off." An "off" state is considered to exist when an internal combustion engine-powered vehicle as well as a so-called "hybrid" vehicle, is in a state wherein the internal combustion engine is not running or it is not providing power to charge or re-charge a battery. An "off" state is considered to exist in an all-electric vehicle when the vehicle is stationary and not being charged.

At step 302, the method determines that the vehicle is in an off condition thereby placing the battery at risk of being depleted by current-draining devices in the vehicle.

When the vehicle is shut off or determined to be in an off condition and one or more devices 126 continue to draw energy from a vehicle battery, the method 300 first determines the current drain of the various electrical loads 126 on the battery 120 at step 304. As stated above, the battery condition is evaluated to determine how long it can last under various conditions. In FIG. 3 this determination or measurement occurs at step 306 but those of ordinary skill of the art will recognize that the evaluation of the battery capacity before or after the evaluation of the current drain is a design choice.

Regardless of whether the battery capacity is measured before or after the current drain caused by the various electrical loads, a power consumption message is transmitted at step 308. In one embodiment, a timer is started at step 310. The timer is referred to herein as a message response timer. At step 310, the message response timer is started followed by a test 312 of whether a response message has been received by the telematics communications device. If no response message is received after the response message has been started, the program continues to wait for a response message for the duration of a response message timer. The program thus loops steps 312 and 314 until a response message is received or the response message timer times out.

Still referring to step 312, if a response message is received, the power down sequence in that message is executed at step 314. As stated above, the timing, ordering or sequencing of devices to power down is selectable by a vehicle operator, a telematics service provider or some other party, a salient feature being that the power down sequence can be specified manually rather than automatically.

The apparatus for controlling power consumption is configured to monitor all devices that are drawing current from the battery, and which are capable of drawing current from the battery, when the vehicle is turned off. It also has the ability to monitor the current environmental condition of the battery. It is also configured to be able to use a cellular or other wireless network to download predictive data such as the 10 day hour by hour temperature forecast.

The apparatus can use some or all of the gathered data, including a projected future temperature profile, to make calculations that predict remaining battery life. When the apparatus "sees" that the battery is below some capacity, the apparatus places a call to a telematics service provider or an operator communicate the predicted hours, minutes, days or weeks of charge left in the battery based on existing power consumption and an existing or predicted or expected temperature profile. The message can include text messages or audio files that warn or predict a battery power loss or battery failure and which can suggest actions that can or should be taken to reduce power consumption.

Figure 4:
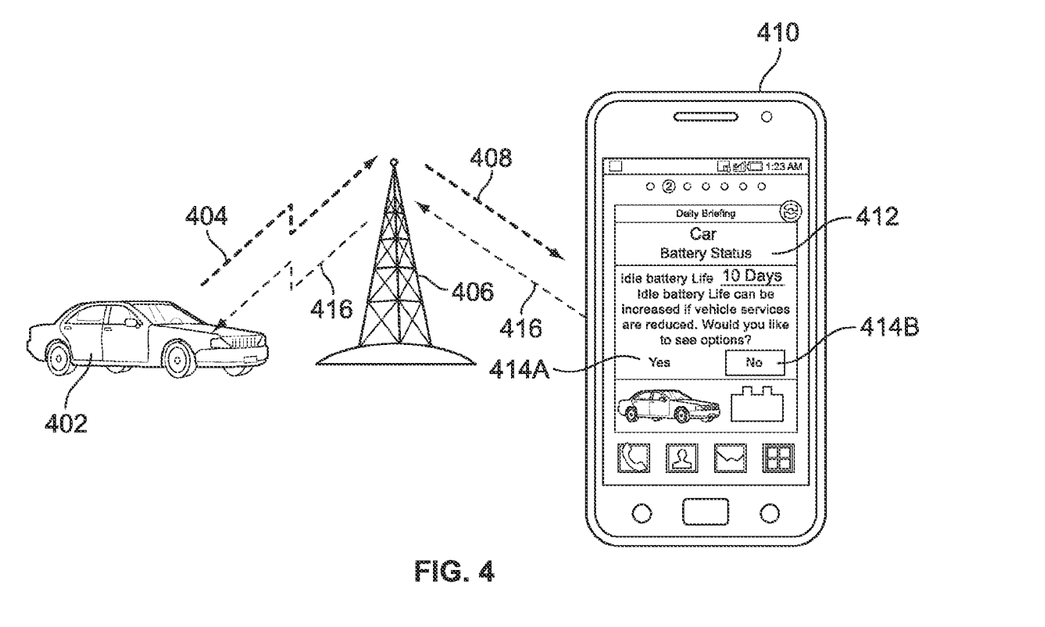
FIGS. 4-6 depict examples of interactive, power control dialogue between a vehicle and an operator of the vehicle in accordance with embodiments of the invention.
Figure 5:
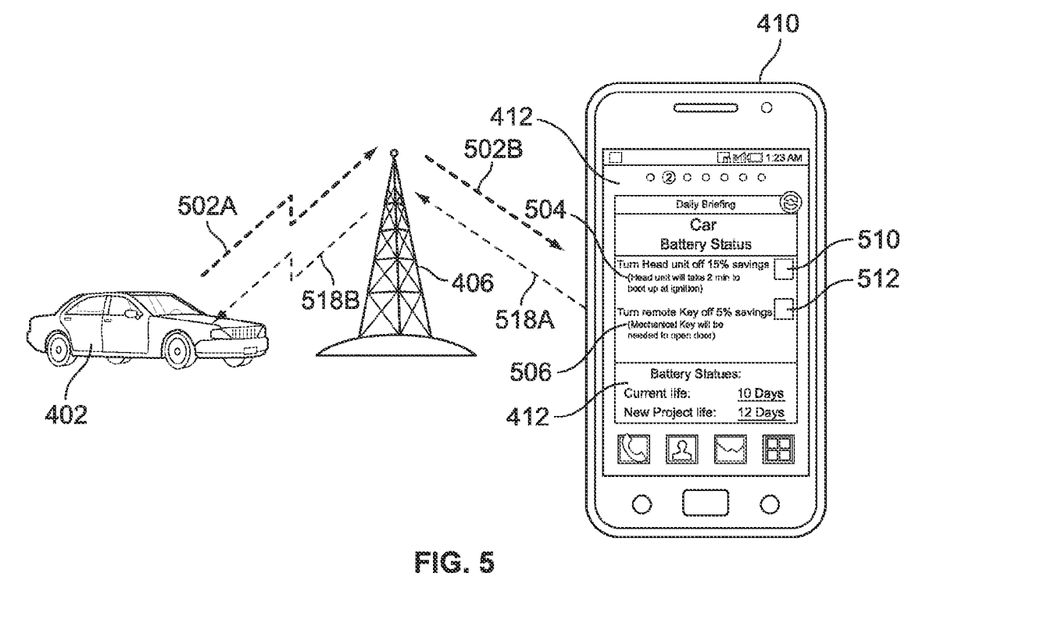
Figure 6:
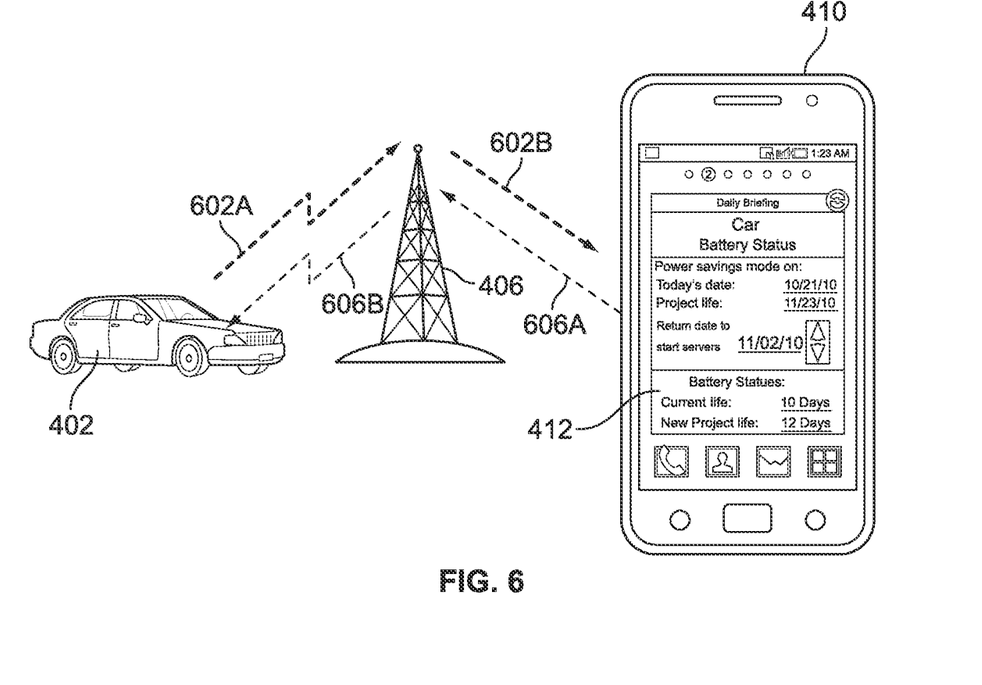

FIGS. 4, 5, and 6 depict an interactive, power control dialogue between a vehicle and an operator of the vehicle, who is located away from the vehicle but who is nevertheless able to choose whether to change the power consumption rate and how to change it using a telematics master of power device and a wireless communications device. The dialogue is effectuated in large part by a telematics-capable vehicle, a telematics master of power such as the one depicted in FIG. 1, a wireless communications network compatible with the telematics devices that comprise the telematics-capable vehicle, and a wireless communications device compatible with the network.

In FIG. 4, a vehicle 402 equipped with a telematics master of power apparatus, such as the one shown in FIG. 1 and equivalents thereof, is depicted as transmitting a power consumption notification message 404 from the vehicle 402 to a telematics service provider via a cellular or other wireless communications network, represented in FIG. 4 by an antenna tower 406. The power consumption message 404 includes information obtained by the vehicle-located apparatus shown in FIG. 1. Such information includes, but is not limited to, current drain of various loads powered by the battery. It can also include vehicle type and location, outside temperature and the battery's size or capacity and its age.

Data in the power consumption notification message 404 sent to the telematics service provider is processed to provide an estimate of the usable life left in the battery. After processing, the consumption notification message 404 is re-transmitted from the telematics service provider as a second, processed or formatted power consumption notification message 408, which is configured to be displayed on a wireless communications device 410. The power consumption notification message 408 from the telematics service provider is thus transmitted to, and received by, a vehicle operator's wireless communications device 410, so long as the device 410 is within signal range of a wireless communications network 406.

As shown in FIG. 4, information in the message 408 from the telematics service provider is formatted by the telematics service provider to be compliant with the display parameters and functionality of the display device 412 on the wireless communications device 410. As also shown in FIG. 4, the power consumption notification message 408 includes information that identified the model of the vehicle that the message 408 pertains to. Additional information in the message 408 includes the battery's useful life remaining at the existing rate of discharge.

FIG. 4 shows two touch-sensitive areas or regions 414A and 414B on the display device 412 of the communications device 410. Selection or actuation of one these two regions 414A and 414B enable the user of the wireless communications device 410 to decide whether to remotely change the rate at which current is being drained from the battery (a "YES" selection 414A) or to allow the vehicle 402 to continue to operate normally ("NO" selection 414B). The selection made by the user is transmitted to the vehicle 402 via an outbound, power-down response message 416, i.e., a message directing the vehicle-located power control apparatus, instructing it whether to execute a user-specified power-down sequence or a default power down sequence.

If the user of the wireless communications device selects "YES" which means that the vehicle operator wants to customize or specify which power-consuming devices to turn off or power down, the apparatus shown in FIG. 1, or the vehicle-located telematics controller responds with one or more power-down choices for the operator. If the vehicle operator selects "NO," the vehicle will continue to operate normally. The power-down response message 416 indicates that no changes to the power consuming devices should be made.

FIG. 5 depicts the display of a telematics master of power response to an operator's "YES" selection to a power consumption notification message 408 from a telematics service provider, i.e., that the operator wants to see options of which power-consuming devices to shut down or alter the operation of is presented with a choice of turning off the vehicle's head unit or turning off the radio used by the vehicle's remote keyless entry system. An update message 502A is sent from the vehicle 402 to the wireless communications device 410 via the telematics service provider and the wireless network 406. The update message 502A is processed by the telematics service provider for display on the display device 412 of the wireless communications device 410. The telematics service provider re-transmits the message 502B to the wireless communications device 410.

In FIG. 5, the power savings realized by two different vehicle operation changes 504 and 506 are displayed on the display device 412 with corresponding touch-sensitive selection areas 510 and 512.

When an operator selects one or both power-saving actions depicted in FIG. 5, the wireless communications device 410 transmits a corresponding power-down command message 518A, i.e., one containing information that identifies the operator's selection(s). The power-down command message 518A is transmitted to the telematics service provider via a wireless communications network 406. The telematics service provider extracts power down command information and formats it for the telematics controller and/or the master of power apparatus in the vehicle. It then forwards the power-down command message 518B, or a variant thereof, to the vehicle 402 via the wireless communications network.

Referring now to FIG. 6, when the vehicle receives the power-down command message 518B, it responds with a power consumption update message 602A to the operator. The power consumption update message 602A is transmitted to the telematics service provider via the wireless communications network 406. When the telematics service provider receives the power consumption update message 602A from the vehicle 402, it prepares a power consumption update message 602B for the display device 412 of the wireless communications device 410. The wireless communications device 410 is configured to provide the operator with the ability to send another power-down command message 606A to the telematics service provider, which reformats the message to be compatible with the equipment on the vehicle 402. The message is reformatted 602A and transmitted to the vehicle.

As can be seen in FIG. 6, the wireless communications device 410 shows how the vehicle's power consumption reduction that was effectuated by the devices that were shut down by the previously-received power-down command message. An operator of vehicle can thus conduct a power-reducing dialogue with a vehicle 402 provided with a telematics system master of power, such as the apparatus shown in FIG. 1. The dialogue can be via a web site or web page, an e-mail exchange, an short message service or "SMS" message exchange or other protocols.

In one embodiment, the operator can be provided a list of actions that can be taken to increase the life of the battery. Such information is preferably sent by a wireless communication network, as a message to a smart phone or to an e-mail address. The message preferably explains the potential power savings as shown in FIG. 5 and the effect it will have on the vehicle. The message can also simply be a list of actions that can be directed or specified by the operator.

In another embodiment, a driver or other vehicle user can be given an opportunity to put in a date or time when the driver or operator will return to the vehicle. The apparatus can use this date or time to preemptively turn all services back on, based on available battery power.

In yet another embodiment, GPS-equipped smart phones can periodically or continuously provide a location of the phone, to the apparatus in the vehicle, via the wireless communication network. In such an embodiment, the apparatus in the vehicle can be configured to determine the distance between the smart phone and the vehicle and determine the rate at which the separation distance decreases and preemptively turn current-drawing devices back on when the driver or operator is within a predetermined distance from the car.

Upon receipt of the power down sequence at step 314, the method proceeds to step 316 where it waits for the vehicle to be turned back "on."

When the response message timer is determined to have timed out at step 314, the method executes a default power down sequence at step 320. The default power down sequence 320 is preferably specified to minimize the current drawn from the battery over time and to thereby maximize the time that the telematics communications device can be operated without jeopardizing the ability of the car to be restarted. In one embodiment, the power down sequence even turns off the telematics communications device when the battery capacity has been depleted to a point where it might be unable to start the vehicle.

After the default power down sequence is performed at step 320, the vehicle stays in a state where it waits for the vehicle to be turned on. When power to the vehicle is resumed or the power enters an "on" state the program proceeds to step 322 where power is restored to all of the electrical components by virtue of the fact that the engine is running and therefore presumably charging the battery.

The foregoing description is for purposes of illustration only. The true scope of the invention is set forth is the appurtenant claims.

The invention claimed is:

1. A method of controlling power consumption from a battery in a vehicle having an engine and a plurality of electrically-powered devices, the method comprising:
   detecting a vehicle off state;
   monitoring electric power consumption of devices while the vehicle is in the off state;
   monitoring usable amp-hours remaining in the battery and determining how long the battery can provide power to battery power-consuming devices, before the vehicle will not be able to be started using the battery;

wirelessly transmitting a power consumption notification message;

selectively powering off at least one of the devices according to a power-down instruction message received at the vehicle through a telematics communications device;

powering off at least one of the devices according to a default ordering, if a power-down instruction message is not received at the vehicle prior to expiration of a default power-down sequence time out value, the default ordering comprising an ordering of battery power-consuming devices to be powered down responsive to an expected power requirement of the battery to start the vehicle engine at a future date, the expected power requirement to start the vehicle engine at the future date being determined by at least one of a plurality of conditions that comprise: ambient temperature, battery age, elapsed time of the vehicle in the off state and, a history of the power required from the battery to start the vehicle's engine; and wherein the power consumption notification message specifies how long the battery can continue to provide power to the battery power-consuming devices before the vehicle will not be able to be started and wherein the power down instruction received at the vehicle specifies devices to be powered off.

2. The method of claim 1, wherein the power down instruction received at the vehicle is comprised of an ordering of the devices in the specification to be powered off.

3. The method of claim 1, wherein the specification of devices to be powered off is determined manually by an operator of the vehicle, after transmission of the power consumption notification message.

4. The method of claim 1, wherein the step of wirelessly transmitting a power consumption notification and the step of powering off at least one of the device comprise a power control dialogue with the vehicle.

5. The method of claim 1, wherein expected power requirements to start the vehicle engine are determined using a plurality of:
   ambient air temperature;
   vehicle location;
   elapsed time in the off state;
   battery age; and
   a history of the battery power required from the battery in order to start the vehicle's engine; and
   the battery's initial charge level.

6. The method of claim 1, further comprising wirelessly receiving position information from a wireless communication device and turning current-drawing devices back on when the wireless communication device comes within a predetermined distance of the vehicle.

7. The method of claim 1, wherein the power consumption notification message specifies a plurality of current-drawing devices and a corresponding amount of current-drawing savings attributable to shutting down each of the plurality of current-drawings devices.

8. The method of claim 1, further comprising wirelessly receiving from a wireless communication device date and time information specifying when a driver will return to the vehicle and preemptively turning current-drawing devices back on based on the received date and time information.

9. An apparatus for controlling power consumption in a vehicle having an engine and a plurality of electrically-powered devices, which normally draw current from a vehicle battery when the vehicle is in an off state, the apparatus comprising:

a vehicle power consumption monitor, configured to monitor electric power consumption of battery power-consuming devices, while the vehicle is in the off state, the vehicle power consumption monitor being additionally configured to determine how long the battery can provide power to battery power-consuming devices before the vehicle engine will not be able to be started using the battery;

a wireless communications device, configured to wirelessly transmit a power consumption notification message, the power consumption notification message comprising a projection of how long the battery can continue to provide power to the battery power-consuming device before the vehicle will not be able to be started;

a switch mechanism, configured to selectively cut off battery power to at least one of the electrically-powered devices;

wherein the switch mechanism is additionally configured to power off devices according to a default ordering, if a power-down instruction is not received at the vehicle through the wireless communications device, prior to expiration of a default power-down sequence time out value, the default ordering comprising an ordering of battery power-consuming devices to be powered downed responsive to an expected power requirement of the battery to start the vehicle engine at a future date, the expected power requirement to start the vehicle engine at the future date being determined by the vehicle power consumption monitor using at least one of a plurality of conditions that comprise: ambient temperature, battery age, elapsed time of the vehicle in the off state and, a history of the power required from the battery to start the vehicle's engine; and wherein the wireless communications device is configured to wirelessly transmit a power consumption notification message that specifices how long the battery can continue to provide power to the battery power-consuming devices before the vehicle will not be able to be started, wherein the wireless communications device is configured to receive a power-down instruction and wherein the switch mechanism is coupled to the wireless communications device and configured to be able to selectively power off devices according to a received power-down instruction.

10. The apparatus of claim 9, wherein the received power-down instruction is comprised of a user-specified order of devices to be powered off.

11. The apparatus of claim 9, wherein the vehicle power consumption monitor is configured to determine anticipated power requirements from a plurality of:
   ambient air temperature;
   vehicle location;
   elapsed time in the off state;
   battery condition; and
   a history of the battery power required from the battery to start the vehicle's engine; and
   the battery's initial charge level.

12. The apparatus of claim 9, wherein the wireless communications device is a cellular telephone, configured to provide telematics communications cap ability.

13. The apparatus of claim 9, wherein the switch mechanism is comprise of a semiconductor device operatively coupled between a battery and a device and coupled to a processor, the semiconductor device being configured to connect and disconnect the device to the battery, responsive to signals provided by the processor.

14. The apparatus of claim 11, further comprising a global positioning system configured to provide the vehicle location.

15. The apparatus of claim 11, wherein the vehicle power consumption monitor is comprised of:
- a processor operatively coupled to a memory device storing program instructions;
- an ambient air temperature sensor coupled to the processor; and
- wherein the wireless communications device is operatively coupled to, the memory device storing program instructions, which when executed cause the processor to obtain a weather forecast through the wireless communications device and to thereafter effectuate a selective powering off of devices responsive to the weather forecast.

16. The apparatus of claim 15, wherein the wireless communications device, the processor and the program instructions are configured and arranged to transmit a message comprised of an audio file, selected to provide a warning of a battery failure.

17. The apparatus of claim 9, wherein the switch mechanism is further configured to turn battery power back on to the electrically-powered devices when a vehicle user's smart phone comes within a predetermined distance of the vehicle.

18. The apparatus of claim 9, wherein the power consumption notification message specifies a plurality of current-drawing devices and a corresponding amount of current-drawing savings attributable to shutting down each of the plurality of current-drawings devices.

19. The apparatus of claim 9, wherein the switch mechanism is further configured to preemptively turn battery power back on to the electrically-powered devices based on wirelessly received date and time information specifying when a driver will return to the vehicle.

* * * * *